(12) United States Patent
Cheng et al.

(10) Patent No.: US 8,295,039 B2
(45) Date of Patent: Oct. 23, 2012

(54) ELECTRONIC DEVICE

(75) Inventors: Yung-Fa Cheng, Taipei Hsien (TW); Kuo-Hsiang Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 299 days.

(21) Appl. No.: 12/788,334

(22) Filed: May 27, 2010

(65) Prior Publication Data

US 2011/0122556 A1 May 26, 2011

(30) Foreign Application Priority Data

Nov. 24, 2009 (CN) .......................... 2009 1 0310303

(51) Int. Cl.
*G06F 1/16* (2006.01)
*H05K 5/00* (2006.01)
*H05K 7/00* (2006.01)

(52) U.S. Cl. .......... 361/679.26; 361/679.45; 361/679.55

(58) Field of Classification Search .. 361/679.4–679.45, 361/679.55
See application file for complete search history.

(56) References Cited

U.S. PATENT DOCUMENTS

| | | | | | |
|---|---|---|---|---|---|
| 5,255,214 | A | * | 10/1993 | Ma | 361/679.06 |
| 5,293,300 | A | * | 3/1994 | Leung | 361/679.59 |
| 5,460,547 | A | * | 10/1995 | Belt et al. | 439/638 |
| 5,583,744 | A | * | 12/1996 | Oguchi et al. | 361/679.58 |
| 5,594,617 | A | * | 1/1997 | Foster et al. | 361/679.02 |
| 5,642,258 | A | * | 6/1997 | Barrus et al. | 361/679.59 |
| 5,677,827 | A | * | 10/1997 | Yoshioka et al. | 361/679.58 |
| 5,721,668 | A | * | 2/1998 | Barrus et al. | 361/679.59 |
| 5,729,478 | A | * | 3/1998 | Ma et al. | 361/679.41 |
| 5,808,862 | A | * | 9/1998 | Robbins | 361/679.09 |
| 5,901,035 | A | * | 5/1999 | Foster et al. | 361/679.55 |
| 6,002,583 | A | * | 12/1999 | Shoji et al. | 361/679.55 |
| 6,078,496 | A | * | 6/2000 | Oguchi et al. | 361/679.55 |
| 6,128,184 | A | * | 10/2000 | Ito et al. | 361/679.27 |
| 6,191,941 | B1 | * | 2/2001 | Ito et al. | 361/679.27 |
| 6,233,141 | B1 | * | 5/2001 | Lee et al. | 361/679.57 |
| 6,307,740 | B1 | * | 10/2001 | Foster et al. | 361/679.1 |
| 6,385,039 | B1 | * | 5/2002 | Chiang et al. | 361/679.09 |
| 6,385,041 | B1 | * | 5/2002 | Choi | 361/679.41 |
| 6,411,503 | B1 | * | 6/2002 | Kambayashi et al. | 361/679.41 |
| 6,452,795 | B1 | * | 9/2002 | Lee | 361/679.41 |
| 6,456,488 | B1 | * | 9/2002 | Foster et al. | 361/679.1 |
| 6,492,974 | B1 | * | 12/2002 | Nobuchi et al. | 345/156 |
| 6,535,378 | B1 | * | 3/2003 | Oguchi et al. | 361/679.55 |
| 6,612,668 | B2 | * | 9/2003 | Doan | 312/223.2 |
| 6,744,623 | B2 | * | 6/2004 | Numano et al. | 361/679.27 |
| 6,768,637 | B1 | * | 7/2004 | Amemiya | 361/679.55 |
| 6,792,480 | B2 | * | 9/2004 | Chaiken et al. | 710/14 |
| 6,795,305 | B2 | * | 9/2004 | Tanaka et al. | 361/679.27 |
| 6,819,961 | B2 | * | 11/2004 | Jacobs et al. | 700/17 |
| 6,831,229 | B1 | * | 12/2004 | Maatta et al. | 174/66 |
| 6,894,893 | B2 | * | 5/2005 | Hidesawa | 361/679.55 |
| 6,930,881 | B2 | * | 8/2005 | Karidis et al. | 361/679.55 |
| 6,956,734 | B2 | * | 10/2005 | Shin et al. | 361/679.55 |
| 6,975,890 | B2 | * | 12/2005 | Wu et al. | 455/575.1 |

(Continued)

*Primary Examiner* — Adrian S Wilson

(74) *Attorney, Agent, or Firm* — Altis Law Group, Inc.

(57) ABSTRACT

An electronic device includes a main body, and a connecting component. The connecting component comprises at least one interface. The connecting component is capable of rotating with respect to the main body to switch between a first state in which the at least one interface is hidden under the main body and a second state in which the at least one interface exposes out of the main body.

14 Claims, 4 Drawing Sheets

U.S. PATENT DOCUMENTS

| | | | |
|---|---|---|---|
| D514,098 S * | 1/2006 | Huang et al. | D14/315 |
| 6,999,801 B2 * | 2/2006 | Cheng et al. | 455/575.1 |
| 7,016,183 B2 * | 3/2006 | Takemoto et al. | 361/679.07 |
| D519,500 S * | 4/2006 | Maskatia et al. | D14/318 |
| 7,113,397 B2 * | 9/2006 | Lee | 361/679.06 |
| 7,199,999 B2 * | 4/2007 | Shin et al. | 361/679.55 |
| 7,206,198 B2 * | 4/2007 | Wang | 361/679.55 |
| 7,345,872 B2 * | 3/2008 | Wang | 361/679.55 |
| 7,353,050 B2 * | 4/2008 | Im et al. | 455/575.3 |
| 7,433,182 B2 * | 10/2008 | Fan | 361/679.55 |
| 7,453,440 B2 * | 11/2008 | Sun | 345/168 |
| 7,489,507 B2 * | 2/2009 | Karashima et al. | 361/679.28 |
| 7,492,891 B2 * | 2/2009 | Eldon | 379/433.12 |
| 7,502,222 B2 * | 3/2009 | Cheng et al. | 361/679.55 |
| 7,510,420 B2 * | 3/2009 | Mori | 439/446 |
| 7,542,274 B2 * | 6/2009 | Minaguchi et al. | 361/679.55 |
| D603,330 S * | 11/2009 | Iseki | D13/103 |
| 7,626,814 B2 * | 12/2009 | Seibert et al. | 361/679.45 |
| 7,778,016 B2 * | 8/2010 | Minaguchi et al. | 361/679.17 |
| 7,787,914 B2 * | 8/2010 | Ahn et al. | 455/575.3 |
| 7,852,625 B2 * | 12/2010 | Asawa et al. | 361/679.55 |
| 7,929,291 B2 * | 4/2011 | Park et al. | 361/679.41 |
| 2002/0111186 A1 * | 8/2002 | Cheng et al. | 455/550 |
| 2003/0184962 A1 * | 10/2003 | Kambayashi et al. | 361/683 |
| 2005/0059283 A1 * | 3/2005 | Lo | 439/296 |
| 2005/0099533 A1 * | 5/2005 | Matsuda et al. | 348/375 |
| 2005/0110761 A1 * | 5/2005 | Minaguchi et al. | 345/168 |
| 2005/0186985 A1 * | 8/2005 | Im et al. | 455/550.1 |
| 2005/0272462 A1 * | 12/2005 | Okamoto | 455/550.1 |
| 2006/0126281 A1 * | 6/2006 | Kwon | 361/681 |
| 2006/0133021 A1 * | 6/2006 | Fan | 361/683 |
| 2006/0179612 A1 * | 8/2006 | Oshima et al. | 16/330 |
| 2006/0250767 A1 * | 11/2006 | Brophy et al. | 361/686 |
| 2006/0264243 A1 * | 11/2006 | Aarras | 455/566 |
| 2008/0194119 A1 * | 8/2008 | Mori | 439/13 |
| 2009/0009955 A1 * | 1/2009 | Motoe | 361/685 |
| 2009/0135553 A1 * | 5/2009 | Bao | 361/679.4 |
| 2009/0149226 A1 * | 6/2009 | Watanabe | 455/575.3 |
| 2009/0190295 A1 * | 7/2009 | Chin et al. | 361/679.27 |

* cited by examiner

ELECTRONIC DEVICE

BACKGROUND

1. Technical Field

The present disclosure relates to electronic devices, and particularly to an electronic device with at least one interface.

2. Description of Related Art

A notebook computer commonly has several interfaces arranged in its sidewalls for electrically connecting peripheral devices. However, when the interfaces are not in use, they accumulate dust and grime and made prove unreliable when in use.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
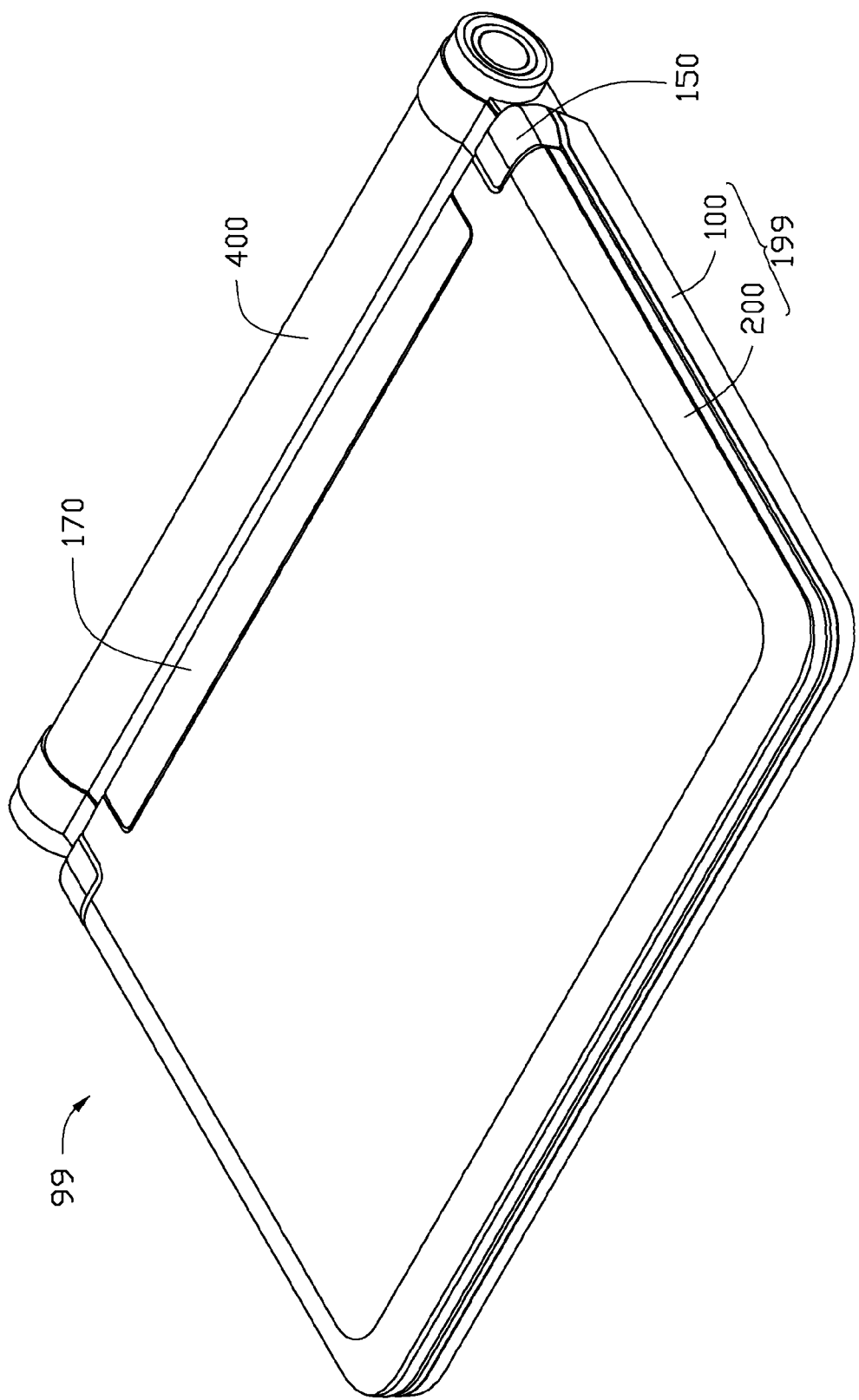
FIG. 1 is a perspective view of an electronic device in accordance with an exemplary embodiment.
Figure 2:
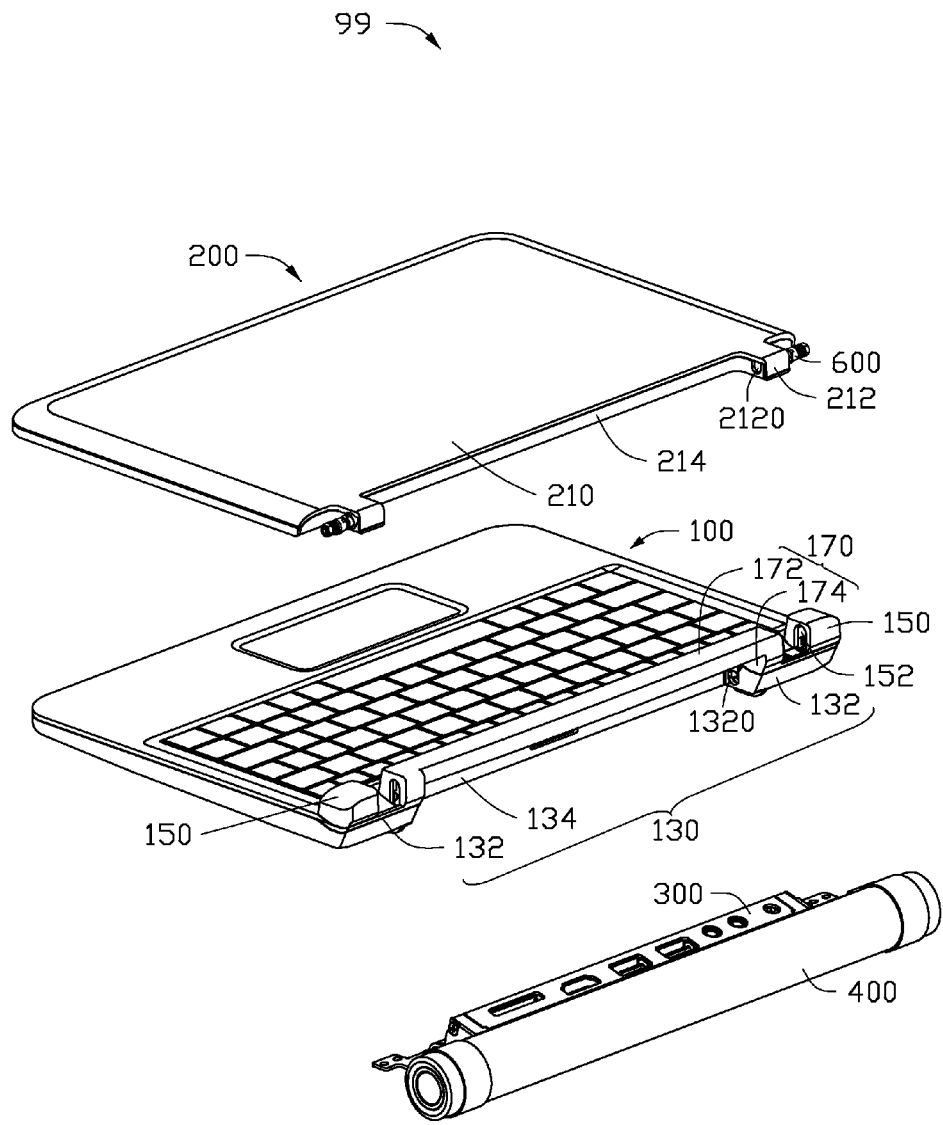
FIG. 2 is an exploded view of the electronic device of FIG. 1.

Referring to FIGS. 1 and 2, an electronic device 99 includes a main frame 199. The main frame 199 includes a main body 100, and a lid 200 pivotably connected to the main body 100. The lid 200 covers the main body 100. The electronic device 99 also includes a connecting component 300, and a supporting component 400 pivotably connected to the main body 100. The connecting component 300 is received in the supporting component 400. The supporting component 400 aligns with the main frame 199.

The main body 100 includes a first side 130, two first shaft retainers 150, and a covering member 170. The covering member 170 is disposed between the two first shaft retainers 150.

The first side 130 includes two hinge retainers 132. The first side 130 defines a receiving space 134 between the two hinge retainers 132. Each hinge retainer 132 defines a shaft hole 1320 at the side of the receiving space 134. The two shaft holes 1320 communicate with the receiving space 134.

The two first shaft retainers 150 are disposed at opposite ends of the first side 130 respectively. Each first shaft retainer 150 defines a shaft hole 152 at the side of the covering member 170.

The covering member 170 is adapted to cover the receiving space 134. The covering member 170 includes a covering portion 172, and two connecting portions 174. The covering portion 172 is strip shaped and substantially parallel to the first side 130. The two connecting portions 174 are connected between opposite ends of the covering portion 172 and ends of the two hinge retainers 132 adjacent to the receiving space 134 respectively.

The lid 200 includes a second side 210 pivotably connected with the first side 130. The second side 210 includes two second shaft retainers 212. The second side 210 defines an opening 214 between the two second shaft retainers 212.

Each second shaft retainer 212 defines a shaft hole 2120. Two ends of each shaft 600 are capable of extending through the shaft hole 2120 of the second shaft retainer 212 and the shaft hole 152 of the first shaft retainer 150 to fasten on the lid 200 and the main body 100 respectively. Therefore, the lid 200 is capable of rotating with respect to the main body 100. At the same time, the covering member 170 is received in the opening 214.

Figure 3:
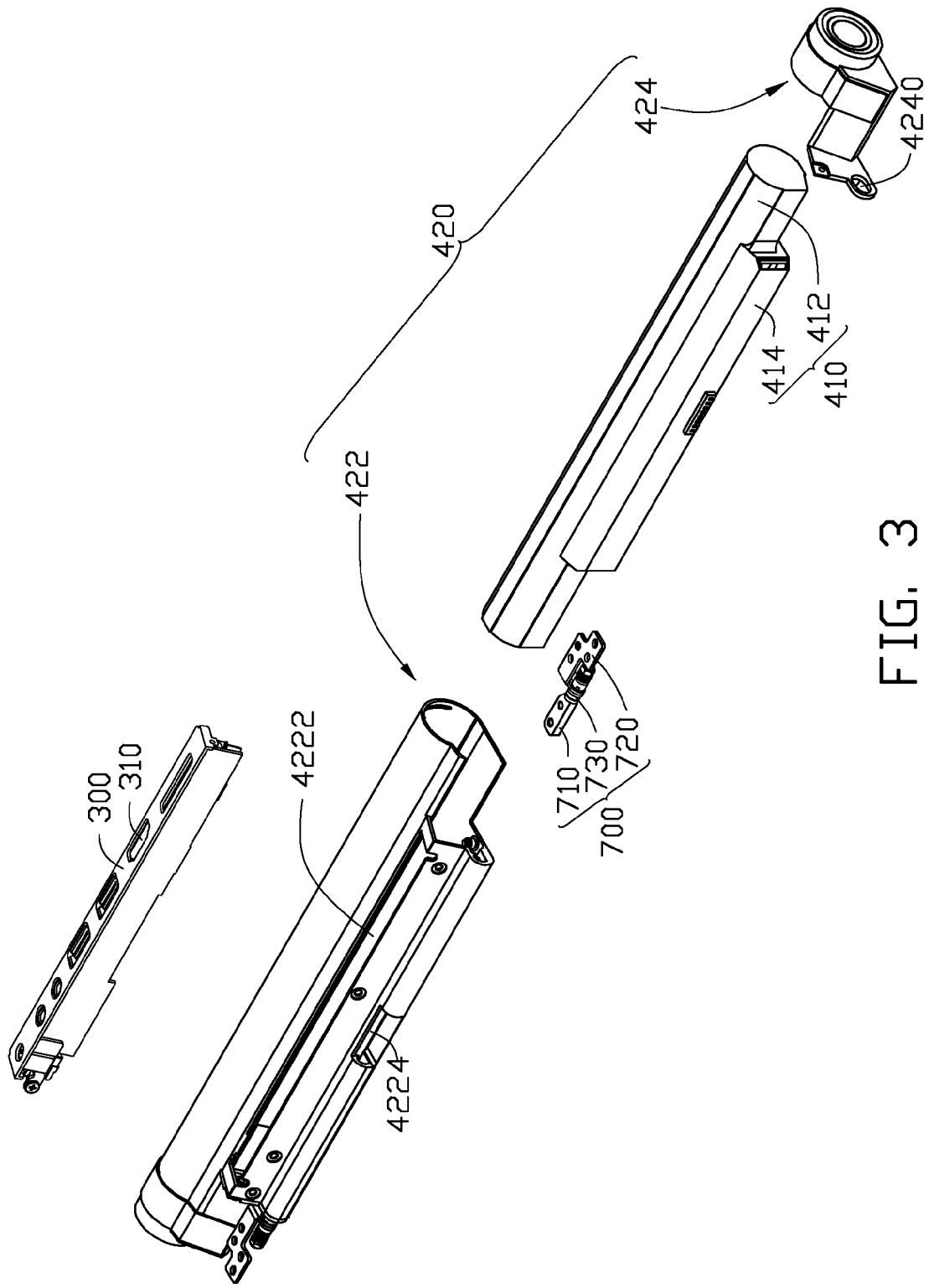
FIG. 3 is an exploded view of a part of the electronic device of FIG. 1.

Referring also to FIG. 3, the connecting component 300 includes a plurality of interfaces 310 for electrically connecting peripheral devices.

The supporting component 400 is used for supporting the main body 100. The supporting component 400 includes a supporting member 410, and a housing 420 for receiving the connecting component 300 and the supporting member 400. The supporting member 410 includes a base portion 412 and a connecting portion 414 protruding from the base portion 412. The connecting portion 414 is used for connecting the connecting component 300 to the base portion 412.

The housing 420 includes a sleeve 422, and two covers 424 covering two opposite ends of the sleeve 422. The two covers 424 combine with the sleeve 422 to form a space for accommodating the connecting component 300 and the supporting member 410.

The sleeve 422 define a first opening 4222 and a second opening 4224. The plurality of interfaces 310 expose out of the housing 420 through the first opening 4222 to connect with the peripheral devices. Electrical connecting members (not shown) such as signal cables, electrically connected between the connecting component 300 and electronic components disposed in the main body 100, extend through the second opening 4224.

Each cover 424 defines a shaft hole 4240. The electronic device 99 further includes two hinges 700. Each hinge 700 includes a first fastening portion 710, a second fastening portion 720, and a shaft 730 connected between the first fastening portion 710 and the second fastening portion 720. The first fastening portion 710 of each hinge 700 extends through the shaft hole 4240 of the cover 424 to fasten with the housing 420. The second fastening portion 720 of each hinge 700 extends through the shaft hole 1320 of the hinge retainer 132 to fasten with the main body 100, thus the supporting component 400 and the connecting component 300 received in the supporting component 400 pivotably connects to the first side 130 of the main body 100. Therefore, the supporting component 400 and the connecting component 300 are capable of rotating with respect to the main body 100. At the same time, the connecting component 300 is received in the receiving space 134 such that the plurality of interfaces 310 is hidden under the covering member 170 of the main body 100. In this way, contaminants such as dust are prevented from accumulating on the interfaces 310.

In the embodiment, the supporting member 410 may be a battery for supplying electrical power to the electronic device 99. The base portion 412 is the base portion of the battery. The connecting portion 414 is used for electrically connecting the connecting component 300 with the base portion of the battery.

Figure 4:
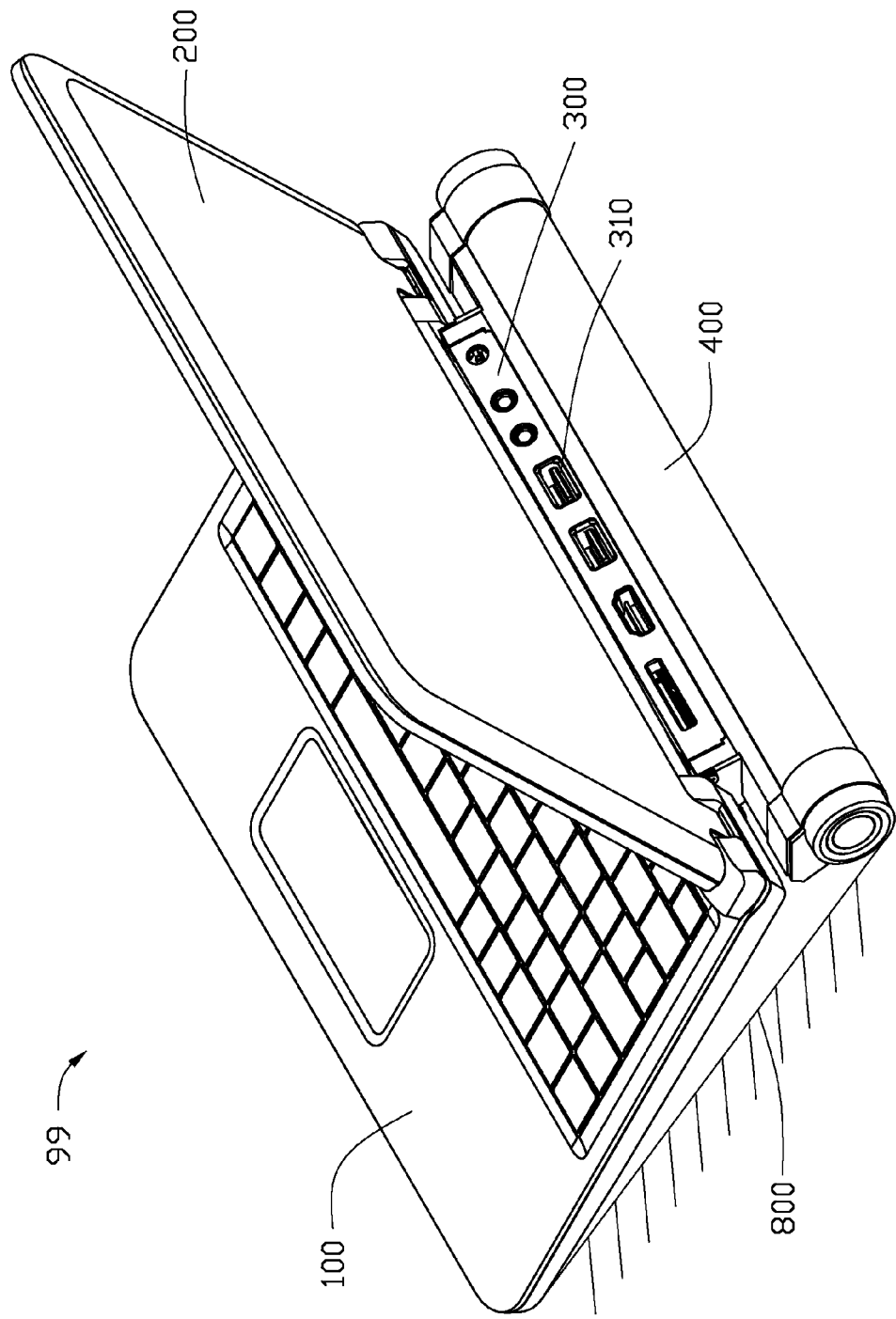
FIG. 4 is a schematic view of the electronic device of FIG. 1 in use.

Referring to FIG. 4, in use, the lid 200 rotates away from the main body 100 via the shafts 600. The connecting component 300 and the supporting component 400 together are capable of rotating with respect to the main body 100 through the hinges 700, thus the plurality of interfaces 310 of the connecting component 300 expose out of the covering member 170. It is convenient to electrically connect the peripheral devices to the electronic device 99.

At the same time, the supporting component 400 is capable of supporting the main body 100 such that the main body 100, the supporting component 400, and a flat surface 800, connected between one end of the main body 100 away from the supporting component 400 and one end of the supporting component 400 away from the main body 10, combine to form a triangular structure. When the electronic device 99 is located on a supporting surface and supported by the supporting surface, the main body 100, the supporting component 400, and the supporting surface combine to form a triangular heat dissipation space.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device, comprising:
   a main body;
   a connecting component comprising at least one interface, and capable of rotating with respect to the main body to switch between a first state in which the at least one interface is hidden under the main body and a second state in which the at least one interface exposes out of the main body; and
   a supporting component pivotably connected to the main body, the supporting component comprising a housing for receiving the connecting component;
   wherein the housing comprises a sleeve, and two covers covering two opposite ends of the sleeve, and the two covers combine with the sleeve to form a space for accommodating the connecting component.

2. The electronic device according to claim 1, wherein the main body comprises a first side and a covering member disposed on the first side; wherein the connecting component pivotably connects to the first side; wherein the first side further defines a receiving space, and the covering member covers the receiving space; wherein the connecting component is capable of switching between being received in the receiving space and extending out of the receiving space when the connecting component rotates with respect to the main body; wherein the at least one interface is hidden under the covering member when the connecting component is received in the receiving space, and exposed out of the covering member when the connecting component extends out of the receiving space.

3. The electronic device according to claim 2, further comprising a lid with a second side, the second side pivotably connected to the first side of the main body thus the lid is capable of rotating with respect to the main body, the second side defining an opening for receiving the covering member.

4. The electronic device according to claim 1, wherein the connecting component arranged on the supporting component; the connecting component and the supporting component together being capable of rotating with respect to the main body; when the at least one interface exposes out of the main body, the supporting component supporting the main frame, and combining with the main body and a flat surface connected between one end of the supporting component away from the main body and one end of the main body away from the supporting component to form a triangular structure.

5. The electronic device according to claim 1, wherein the housing defines a first opening for exposing the at least one interface of the connecting component.

6. The electronic device according to claim 1, wherein the supporting component further comprises a supporting member received in the housing, the supporting member comprises a battery, the battery and the connecting component together are capable of rotating with respect to the main frame.

7. An electronic device, comprising:
   a main frame having a first side; and
   a supporting component pivotably connected to the first side, and capable of rotating with respect to the main frame to switch between a first position and a second position; in the first position, the supporting component being aligned with the main frame; in the second position, the supporting component supporting the main frame, and combining with the main frame and a flat surface connected between one end of the supporting component away from the main frame and one end of the main frame away from the supporting component to form a triangular structure;
   wherein the supporting component comprises a connecting component comprising at least one interface, and a housing receiving the connecting component; the housing includes a sleeve, and two covers covering two opposite ends of the sleeve, and the two covers combine with the sleeve to form a space for accommodating the connecting component.

8. The electronic device according to claim 7, wherein the supporting component comprises a battery for supplying electrical power to the electronic device.

9. The electronic device according to claim 8, wherein the battery is received in the housing.

10. The electronic device according to claim 8, wherein the at least one interface is connected to the battery, the connecting component and the battery together being capable of rotating with respect to the main frame, the at least one interface being hidden in the main frame when the supporting component is in the first position, and exposing out of the main frame when the supporting component is in the second position.

11. The electronic device according to claim 7, wherein the main frame comprises a main body with the first side and a lid pivotably connected with the main body, the supporting component capable of rotating with respect to the main body to switch between the first position and the second position; in the first position, the supporting component being aligned with the main body; in the second position, the supporting component supporting the main body, and combining with the main body and the flat surface connected between one end of the supporting component away from the main body and one end of the main body away from the supporting component to form the triangular structure.

12. An electronic device, comprising:
   a main frame with a covering member at a first side thereof;
   a support component pivotably connected to the first side of the main frame and capable of rotating with respect to the main frame to switch between a first position and a second position, the support component comprising a battery;

a connecting component arranged on the supporting component and comprising at least one interface, the connecting component and the battery together capable of rotating with respect to the main frame to switch between a first state in which the at least one interface is hidden under the covering member and a second state in which the at least one interface exposes out of the covering member;

wherein the supporting component comprises a housing receiving the connecting component and the battery; the housing comprises a sleeve, and two covers covering two opposite ends of the sleeve, and the two covers combine with the sleeve to form a space for accommodating the connecting component and the battery; wherein when the supporting component is in the first position, the connecting component is in the first state, and when the supporting component is in the second position, the connecting component is in the second state.

13. The electronic device according to claim 12, wherein when the supporting component is in the first position, the supporting component aligning with the main frame; when the supporting component is in the second position, the supporting component supporting the main frame, and combining with the main frame and a flat surface connected between one end of the supporting component away from the main frame and one end of the main frame away from the supporting component to form a triangular structure.

14. The electronic device according to claim 12, wherein the main frame comprises a main body with the first side and a lid pivotably connected with the main body.

* * * * *